United States Patent
Shin et al.

(10) Patent No.: US 10,239,380 B2
(45) Date of Patent: Mar. 26, 2019

(54) AIR CONDITIONING SYSTEM FOR VEHICLE

(71) Applicant: Hyundai Motor Company, Seoul (KR)

(72) Inventors: Gee Young Shin, Gyeonggi-Do (KR); June Kyu Park, Gyeonggi-do (KR); Keon Soo Jin, Ulsan (KR); Dae Ig Jung, Gyeonggi-do (KR); Kwang Woon Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 58 days.

(21) Appl. No.: 15/189,606

(22) Filed: Jun. 22, 2016

(65) Prior Publication Data

US 2017/0167776 A1   Jun. 15, 2017

(30) Foreign Application Priority Data

Dec. 9, 2015   (KR) .................. 10-2015-0175306

(51) Int. Cl.
| | |
|---|---|
| *B60H 1/00* | (2006.01) |
| *B60H 1/26* | (2006.01) |
| *F24F 13/04* | (2006.01) |
| *F25B 49/02* | (2006.01) |
| *F25B 13/00* | (2006.01) |

(52) U.S. Cl.
CPC ..... *B60H 1/00057* (2013.01); *B60H 1/00842* (2013.01); *B60H 1/00899* (2013.01); *F24F 13/04* (2013.01); *F25B 13/00* (2013.01); *F25B 49/02* (2013.01); *B60H 2001/00142* (2013.01); *B60H 2001/00178* (2013.01)

(58) Field of Classification Search
CPC . F24F 13/04; B60H 1/00057; B60H 1/00842; B60H 2001/00135; B60H 2001/00142; B60H 2001/0015; B60H 2001/00164
See application file for complete search history.

(56) References Cited

U.S. PATENT DOCUMENTS

| | | | | |
|---|---|---|---|---|
| 4,350,020 | A | * | 9/1982 | Rojey .................... F24F 3/147 62/114 |
| 5,277,032 | A | | 1/1994 | See et al. |
| 5,937,669 | A | * | 8/1999 | Okuri ....................... F25B 6/04 62/114 |

(Continued)

FOREIGN PATENT DOCUMENTS

| | | |
|---|---|---|
| JP | 06-040240 A | 2/1994 |
| JP | H0640240 A | 2/1994 |

(Continued)

OTHER PUBLICATIONS

JP 999734: partial English Machine Translation. Accessed Sep. 2017.*

*Primary Examiner* — Jianying Atkisson
*Assistant Examiner* — Tavia Sullens
(74) *Attorney, Agent, or Firm* — Mintz Levin Cohn Ferris Glovsky and Popeo, P.C.; Peter F. Corless

(57) ABSTRACT

An air conditioning system for a vehicle is provided. The system includes a cooling module in which a plurality of evaporation cores are disposed and a heating module in which a plurality of condensers are disposed. The plurality of condensers and the plurality of evaporation cores are connected onto a refrigerant channel.

5 Claims, 3 Drawing Sheets

(56) References Cited

U.S. PATENT DOCUMENTS

| | | | |
|---|---|---|---|
| 6,230,506 B1 * | 5/2001 | Nishida | F25B 13/00 62/160 |
| 6,557,372 B1 | 5/2003 | Ozawa et al. | |
| 2011/0016896 A1 | 1/2011 | Oomura et al. | |
| 2013/0042637 A1 * | 2/2013 | Richter | B60H 1/00057 62/79 |
| 2013/0333406 A1 | 12/2013 | Takahashi | |
| 2015/0082820 A1 | 3/2015 | Takahashi | |
| 2015/0239322 A1 | 8/2015 | Yokoo et al. | |

FOREIGN PATENT DOCUMENTS

| | | |
|---|---|---|
| JP | 08-238919 A | 9/1996 |
| JP | H08238919 A | 9/1996 |
| JP | 09-099734 A | 4/1997 |
| JP | H0999734 A | 4/1997 |
| JP | 2010-023589 A | 2/2010 |
| JP | 201-061877 A | 4/2014 |
| JP | 2014-061876 A | 4/2014 |
| JP | 2015-193381 A | 11/2015 |
| KR | 2002-0038149 A | 5/2002 |
| KR | 2007-0064937 A | 6/2007 |
| KR | 2009-0103742 A | 10/2009 |
| KR | 2014-0073034 A | 6/2014 |
| KR | 10-2015-0039545 A | 4/2015 |

\* cited by examiner

AIR CONDITIONING SYSTEM FOR VEHICLE

CROSS REFERENCE TO RELATED APPLICATION

The present application claims priority to Korean Patent Application No. 10-2015-0175306, filed Dec. 9, 2015, the entire contents of which is incorporated herein for all purposes by this reference.

BACKGROUND

1. Technical Field

The present invention relates to a structure of an air conditioning apparatus for a vehicle, and more particularly, to a configuration of an air conditioning system that provides more efficient air conditioning in a particular operating environment.

2. Description of the Related Art

A vehicle is installed with an air conditioning system that is configured to cool or heat the interior of the vehicle. A cooler in the air conditioning system for a vehicle includes a compressor the compresses a refrigerant, a condenser that condenses the refrigerant compressed in the compressor, an expansion valve that allows the refrigerant condensed and liquefied in the condenser to be a low temperature and low pressure state, and an evaporator that cools air using latent heat of vaporization of the refrigerant, and the like. Generally, this cooling system adjusts absolute humidity while decreasing a temperature of air.

When a coolant for cooling heat of an engine room causes a heat loss in an engine to become a high temperature state, a heating system uses the coolant in the high temperature state as a heat source, and includes a heater core and a pump that are configured to circulate the coolant of the engine. Generally, the heating system adjusts absolute humidity while increasing a temperature of the air. In a general air conditioning system of the related art, cool air is supplied from the cooler, and warm air is supplied through the coolant of the engine. However, a change of a structure may be required based on an operating environment. Particularly, when the coolant of the engine is not present, it may be difficult to configure the existing air conditioning system, and the existing air conditioning system may be inefficient.

The contents described as the related art have been provided merely for assisting in the understanding for the background of the present invention and should not be considered as corresponding to the related art known to those skilled in the art.

SUMMARY

An object of the present invention is to provide an air conditioning apparatus for a vehicle capable of providing a new heat source for supplying warm air, being optimized for the new heat source, having improved efficiency, and solving an icing problem due to excessive cooling of an evaporation core generated in an operation process of the air conditioning system.

According to an exemplary embodiment of the present invention, an air conditioning system for a vehicle may include: a cooling module including a cooling duct, a cooling-side inlet formed at a first side of the cooling duct, a cooling-side indoor outlet and a cooling-side outdoor outlet formed at a second side of the cooling duct, and a plurality of evaporation cores disposed in the cooling duct; a heating module including a heating duct, a heating-side inlet formed at a first side of the heating duct, a heating-side indoor outlet and a heating-side outdoor outlet formed at a second side of the heating duct, and a plurality of condensers disposed in the heating duct; and a cooling blower and a heating blower disposed in the cooling duct and the heating duct, respectively, wherein the plurality of condensers and the plurality of evaporation cores may be connected onto one refrigerant channel.

The evaporation cores may include a first evaporation core disposed adjacently to the cooling-side inlet and a second evaporation core disposed adjacently to the cooling-side outdoor outlet. The condensers may include a first condenser disposed adjacently to the heating-side inlet and a second condenser disposed adjacently to the heating-side outdoor outlet. A compressor and an expansion valve may be disposed on the refrigerant channel, and a refrigerant passing through the compressor may pass through the first condenser and the second condenser and may then be introduced into the expansion valve, and a refrigerant passing through the expansion valve may be circulated through the first evaporation core and the second evaporation core and may then be introduced into the compressor.

The air conditioning system for a vehicle may further include a channel adjusting door disposed between the first evaporation core and the second evaporation core of the cooling duct or between the first condenser and the second condenser of the heating duct to allow the cooling duct and the heating duct to be in communication with each other. The cooling module may include a cooling-side exhaust adjusting door disposed between the indoor outlet and the outdoor outlet of the cooling duct and configured to adjust an amount of air exhausted to the outside, and the heating module may include a heating-side exhaust adjusting door disposed between the indoor outlet and the outdoor outlet of the heating duct and configured to adjust an amount of air exhausted to the outside.

The air conditioning system for a vehicle may further include a controller configured to operate the channel adjusting door, wherein the controller may be configured to operate the channel adjusting door during an operation of the air conditioning system for a vehicle in a cooling mode to supply some of the air passing through the first evaporation core to the heating duct. The controller may further be configured to operate the channel adjusting door to be opened toward the heating duct during an operation of the air conditioning system for a vehicle in a heating mode to supply some of the air passing through the first condenser to the cooling duct.

Additionally, the controller may be configured to adjust operation states of the cooling-side exhaust adjusting door and the heating-side exhaust adjusting door. Particularly, the controller may be configured to operate the heating-side exhaust adjusting door to close the heating-side indoor outlet, and operate the cooling-side exhaust adjusting door to close the cooling-side outdoor outlet, during an operation of the air conditioning system for a vehicle in a cooling mode. The controller may also be configured to operate the heating-side exhaust adjusting door to close the heating-side outdoor outlet, and operate the cooling-side exhaust adjusting door to close the cooling-side indoor outlet, during an operation of the air conditioning system for a vehicle in a heating mode.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
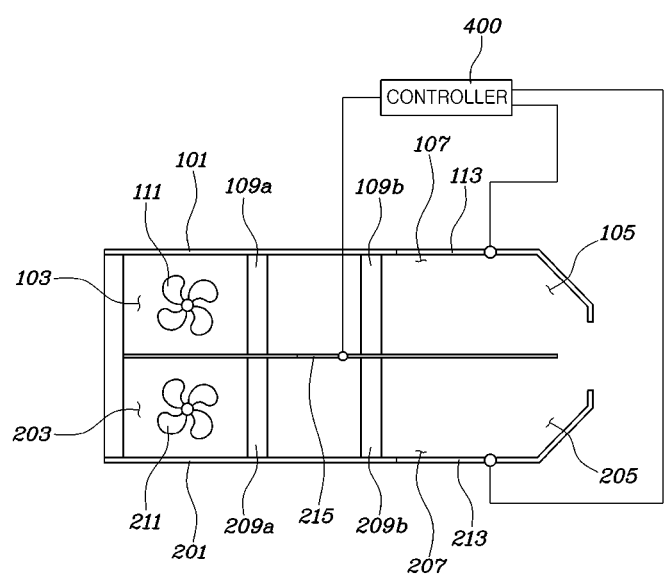
FIG. 1 is a view illustrating a configuration of an air conditioning system for a vehicle according to an exemplary embodiment of the present invention.
Figure 2:
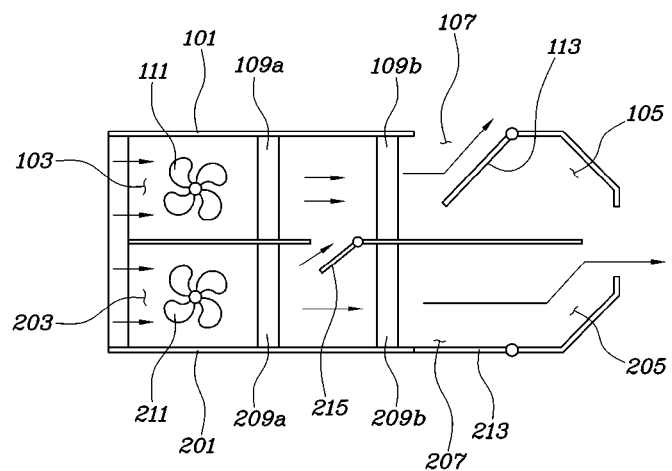
FIG. 2 is a view illustrating an operation state of the air conditioning system for a vehicle according to an exemplary embodiment of the present invention in a heating mode.
Figure 3:
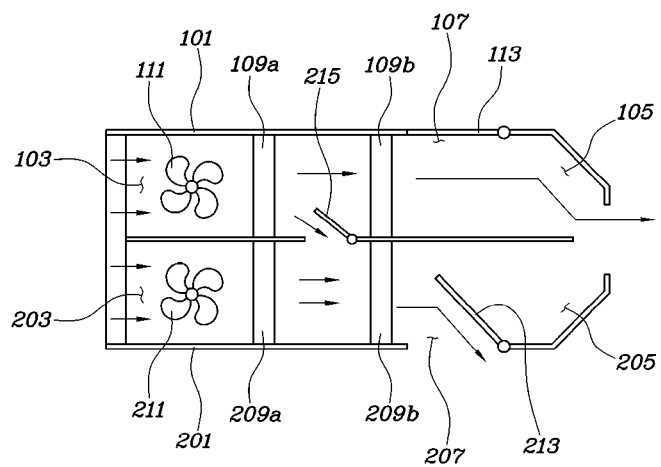
FIG. 3 is a view illustrating an operation state of the air conditioning system for a vehicle according to an exemplary embodiment of the present invention in a cooling mode.
Figure 4:
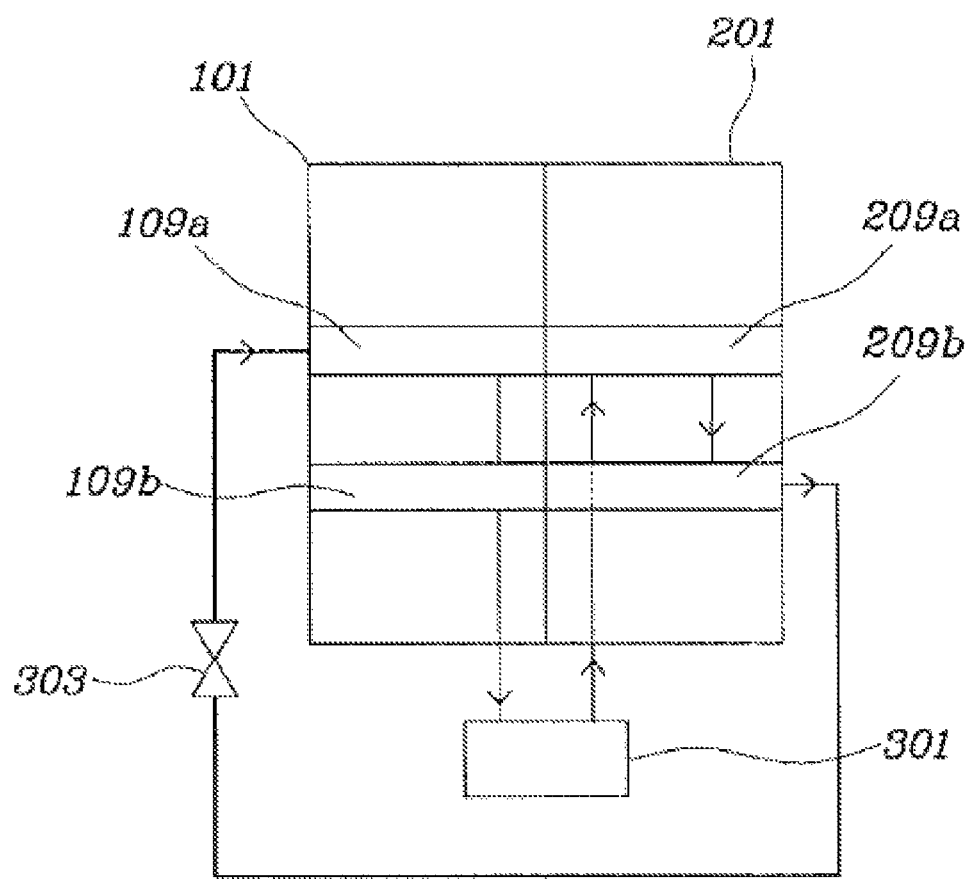
FIG. 4 is a schematic view of coolant circulation of the air conditioning system for a vehicle according to an exemplary embodiment of the present invention.

Hereinafter, exemplary embodiments of the present invention will be described with reference to the accompanying drawings. FIG. 1 is a view illustrating a configuration of an air conditioning system for a vehicle according to an exemplary embodiment of the present invention, FIG. 2 is a view illustrating an operation state of the air conditioning system for a vehicle according to an exemplary embodiment of the present invention in a heating mode, FIG. 3 is a view illustrating an operation state of the air conditioning system for a vehicle according to an exemplary embodiment of the present invention in a cooling mode, and FIG. 4 is a schematic view of coolant circulation of the air conditioning system for a vehicle according to an exemplary embodiment of the present invention.

The air conditioning system for a vehicle according to an exemplary embodiment of the present invention may include a cooling module including a cooling duct 101, a cooling-side inlet 103 formed at a first side of the cooling duct 101, a cooling-side indoor outlet 105 and a cooling-side outdoor outlet 107 formed at a second side of the cooling duct 101, and a plurality of evaporation cores 109a and 109b disposed in the cooling duct 101; a heating module including a heating duct 201, a heating-side inlet 203 formed at a first side of the heating duct 201, a heating-side indoor outlet 205 and a heating-side outdoor outlet 207 formed at a second side of the heating duct 201, and a plurality of condensers 209a and 209b disposed in the heating duct 201; and a cooling blower 111 and a heating blower 211 disposed in the cooling duct 101 and the heating duct 201, respectively, wherein the plurality of condensers 209a and 209b and the plurality of evaporation cores 109a and 109b may be connected onto one refrigerant channel.

Referring to FIG. 1, the cooling module may include the cooling duct 101, the cooling-side inlet 103 formed at the first side of the cooling duct 101, the cooling-side indoor outlet 105 and the cooling-side outdoor outlet 107 formed at the second side of the cooling duct 101, and the plurality of evaporation cores 109a and 109b disposed in the cooling duct 101.

The heating module may include the heating duct 201, the heating-side inlet 203 formed at the first side of the heating duct 201, the heating-side indoor outlet 205 and the heating-side outdoor outlet 207 formed at the second side of the heating duct 201, and the plurality of condensers 209a and 209b disposed in the heating duct 201. The cooling blower 111 and the heating blower 211 may be disposed in the cooling duct 101 and the heating duct 201, respectively. In particular, the plurality of condensers 209a and 209b disposed in the heating duct 201 and the plurality of evaporation cores 109a and 109b disposed in the cooling duct 101 may be connected onto one refrigerant channel.

In the present invention, the cooling duct 101 and the heating duct 201 may be provided as separate independent spaces within the air conditioning system for a vehicle, to reduce interference between air-conditioned air in the cooling duct 101 and air-conditioned air in the heating duct 201 and to thus prevent cooled air from being re-heated or heated air from being re-cooled to improve efficiency of the air conditioning system for a vehicle.

In addition, the cooling blower 111 and the heating blower 211 may be separately provided in the cooling duct 101 and the heating duct 201, respectively to sufficiently secure an amount of air supplied into the interior of the vehicle. Further, outlets of the cooling duct 101 or the heat duct 201 may be separately provided as an indoor outlet and an outdoor outlet. Therefore, air-conditioned air may be exhausted to the exterior of the vehicle in some cases instead of being supplied into the vehicle. The evaporation cores 109a and 109b may include a first evaporation core 109a disposed adjacently to the cooling-side inlet and a second evaporation core 109b disposed adjacently to the cooling-side outdoor outlet 107, and the condensers 209a and 209b may include a first condenser 209a disposed adjacently to the heating-side inlet and a second condenser 209b disposed adjacently to the heating-side outdoor outlet 207.

Referring to FIG. 1, in the present invention, two evaporation cores 109a and 109b may be disposed in the cooling duct 101, and two condensers 209a and 209b may be disposed in the heating duct 201. Therefore, a heat exchange area for cooling air introduced into the interior may be increased and a heat radiation area for condensing a refrigerant compressed at a high temperature and a high pressure in a compressor 301 may be increased during cooling. In addition, a heat exchange area for heating air introduced into the interior may be increased during heating.

The compressor 301 and an expansion valve 303 may be provided on the refrigerant channel, and a refrigerant passing through the compressor 301 may be configured to pass through the first condenser 209a and the second condenser 209b and then may be introduced into the expansion valve 303, and a refrigerant passing through the expansion valve 303 may be circulated through the first evaporation core 109a and the second evaporation core 109b and then may be introduced into the compressor 301.

Referring to FIG. 4, in the present invention, the expansion valve 303, the evaporation cores 109a and 109b, the compressor 301, and the condensers 209a and 209b may be disposed on one cooling line, and thus, the high temperature and high pressure refrigerant passing through the compressor 301 may be used as a heat source. In other words, cooling and heating may be performed simultaneously using only a cooling system in an existing air conditioning system for a vehicle. This may be more usefully particularly when a heat source such as a coolant of an engine, or the like, may not be secured.

In addition, in the air conditioning system for a vehicle according to an exemplary embodiment of the present invention, a separate heating line for the heating, a water pump configured to circulate the coolant of the engine to the air conditioning system, and the like, may be omitted, thus simplifying a structure of the air conditioning system for a vehicle. The air conditioning system for a vehicle may further include a channel adjusting door 215 disposed between the first evaporation core 109a and the second evaporation core 109b of the cooling duct 101 or between the first condenser 209a and the second condenser 209b of the heating duct 201 to allow the cooling duct 101 and the heating duct 201 to be in communication with each other.

Referring to FIG. 1, the channel adjusting door 215 allowing the cooling duct 101 and the heating duct 201 to be in communication with each other may be provided between the first evaporation core 109a and the second evaporation core 109b or between the first condenser 209a and the second condenser 209b. A direction in which the channel adjusting door 215 is opened may be adjusted, thus allowing air introduced into the cooling duct 101 and then passing through the first evaporation core 109a to be introduced into the heating duct 201 or allowing air introduced into the heating duct 201 and then passing through the first condenser 209a to be introduced into the cooling duct 101.

The air conditioning system for a vehicle may further include a controller 400 configured to operate the channel adjusting door 215. In particular, the controller 400 may be configured to operate the channel adjusting door 215 during an operation of the air conditioning system for a vehicle in a cooling mode to supply some (e.g., a predetermined portion of all the air) of the air passing through the first evaporation core 109a to the heating duct 201. When the air conditioning system for a vehicle is operated in the cooling mode, air passing through the cooling duct 101 may be supplied to the interior of the vehicle, and air passing through the heating duct 201 may be exhausted to the exterior of the vehicle. The air conditioning system may generally be operated in the cooling mode in summer during warmer weather conditions.

Particularly, heat radiation in the condenser is an important factor to improve efficiency of cooling. However, when high temperature external air is continuously supplied to the condenser in summer (e.g., warmer weather months or temperatures), heat radiation efficiency may be deteriorated. As a result, heat may not be absorbed sufficiently in the evaporation core, and thus efficiency of the air conditioning system may be deteriorated. In addition, to allow an indoor temperature to be a desired temperature (e.g., user selected temperature or predetermined temperature), the air conditioning system may be operated for a longer period of time, which has an influence on fuel efficiency of the vehicle. Therefore, in the present invention, as illustrated in FIG. 3, some of the air introduced into the cooling duct 101 and then passing through the first evaporation core 109a may be introduced into the heating duct 201 through the control of the channel adjusting door 215 to improve heat radiation efficiency of the condenser, to improve the entire efficiency of the air conditioning system.

The air conditioning system for a vehicle may further include the controller 400 configured to operate the channel adjusting door 215. In particular, the controller 400 may be configured to open the channel adjusting door 215 toward the heating duct 201 during an operation of the air conditioning system for a vehicle in a heating mode to supply some of the air passing through the first condenser 209a to the cooling duct 101. When the air conditioning system for a vehicle is operated in the heating mode, air passing through the heating duct 201 may be supplied to the interior of the vehicle, and air passing through the cooling duct 101 may be exhausted to the exterior of the vehicle.

The air conditioning system may generally be operated in the heating mode in winter when the weather is cold (e.g., during colder weather months or temperatures). In particular, when cold external air is continuously supplied to the evaporation core in winter, the evaporation core may be excessively cooled. As a result, an icing phenomenon, that is, a phenomenon in which moisture in the air is condensed and frozen to block a channel of air passing through the evaporation core may occur in the evaporation core.

Therefore, in the present invention, as illustrated in FIG. 2, some of the air introduced into the heating duct 201 and then passing through the first condenser 209a may be introduced into the cooling duct 101 through the control of the channel adjusting door 215, to prevent the icing phenomenon on a surface of the evaporation core. In addition, since the evaporation core may be configured to absorb heat from warm air supplied through the heating duct 201, a temperature of the refrigerant increases, and thus the entire heating efficiency may be improved.

Moreover, the cooling module may include a cooling-side exhaust adjusting door 113 disposed between the indoor outlet and the outdoor outlet of the cooling duct 101 and may be configured to adjust an amount of air exhausted to the outside. The heating module may include a heating-side exhaust adjusting door 213 disposed between the indoor outlet and the outdoor outlet of the heating duct 201 and configured to adjust an amount of air exhausted to the outside.

In the present invention, whether the air-conditioned air is supplied to the interior of the vehicle or is exhausted to the exterior of the vehicle through the cooling-side exhaust adjusting door 113 and the heating-side exhaust adjusting door 213 may be adjusted. In other words, the cooling-side exhaust adjusting door 113 and the heating-side exhaust adjusting door 213 may be adjusted to change a mixed ratio of air air-conditioned by the cooling module or the heating module, to more accurately condition air within the vehicle.

The air conditioning system for a vehicle may further include the controller 400 configured to adjust operation states of the cooling-side exhaust adjusting door 113 and the heating-side exhaust adjusting door 213. Additionally, the the controller 400 may be configured to operate the heating-side exhaust adjusting door 213 to close the heating-side indoor outlet 205, and operate the cooling-side exhaust adjusting door 113 to close the cooling-side outdoor outlet 107, during the operation of the air conditioning system for a vehicle in the cooling mode.

Additionally, the air conditioning system for a vehicle may further include the controller 400 configured to adjust operation states of the cooling-side exhaust adjusting door 113 and the heating-side exhaust adjusting door 213. Particularly, the the controller 400 may be configured to operate the heating-side exhaust adjusting door 213 to close the heating-side outdoor outlet 207, and operate the cooling-side exhaust adjusting door 113 to close the cooling-side indoor outlet 105, during the operation of the air conditioning system for a vehicle in the heating mode.

When the air conditioning system for a vehicle in a maximum cooling mode, the cooling-side exhaust adjusting door 113 may be configured to close the cooling-side outdoor outlet 107 to allow cooled air to be supplied to the interior of the vehicle, and the heating-side exhaust adjusting door 213 may be configured to close the heating-side indoor outlet 205 to allow heated air to be exhausted to the exterior of the vehicle, as illustrated in FIG. 3. When the air conditioning system for a vehicle in a maximum heating mode, the heating-side exhaust adjusting door 213 may be configured to close the heating-side outdoor outlet 207 to allow heated air to be exhausted to the interior of the vehicle, and the cooling-side exhaust adjusting door 113 may be configured to close the cooling-side indoor outlet 105 to allow cooled air to be supplied to the exterior of the vehicle, as illustrated in FIG. 2.

As set forth above, according to an exemplary embodiment of the present invention, the air conditioning system for a vehicle having high energy efficiency may be configured in an environment in which supply of a coolant of an engine is not present, efficiency of the air conditioning system for a vehicle may be improved, and an icing problem due to the evaporation core excessively cooled in an air conditioning process may be solved.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. An air conditioning system for a vehicle, comprising:
a cooling module including a cooling duct, a cooling-side inlet formed at a first side of the cooling duct, a cooling-side indoor outlet and a cooling-side outdoor outlet formed at a second side of the cooling duct, and a plurality of evaporation cores disposed in the cooling duct,
a heating module including a heating duct, a heating-side inlet formed at a first side of the heating duct, a heating-side indoor outlet and a heating-side outdoor outlet formed at a second side of the heating duct, and a plurality of condensers disposed in the heating duct;
a cooling blower disposed in the cooling duct to supply air passing through the cooling duct and a heating blower disposed in the heating duct to supply air passing through the heating duct;
wherein the evaporation cores include a first evaporation core disposed adjacently to the cooling-side inlet and a second evaporation core disposed adjacently to the cooling-side outdoor outlet, and the condensers include a first condenser disposed adjacently to the heating-side inlet and a second condenser disposed adjacently to the heating-side outdoor outlet;
a channel adjusting door disposed between the first evaporation core and the second evaporation core of the cooling duct and between the first condenser and the second condenser of the heating duct to allow the cooling duct and the heating duct to be in communication with each other; and
a controller configured to operate the channel adjusting door, wherein the controller is configured to operate the channel adjusting door during an operation of the air conditioning system for the vehicle in a cooling mode to supply some of the air passing through the first evaporation core to the heating duct and is configured to open the channel adjusting door toward the heating duct during an operation of the air conditioning system for the vehicle in a heating mode to supply some of the air passing through the first condenser to the cooling duct,
wherein the plurality of condensers and the plurality of evaporation cores are connected onto a refrigerant channel.

2. The air conditioning system for a vehicle of claim 1, wherein a compressor and an expansion valve are disposed on the refrigerant channel, and the refrigerant channel is configured such the refrigerant passing through the compressor passes through the first condenser and the second condenser and is then introduced into the expansion valve, and refrigerant passing through the expansion valve is circulated through the first evaporation core and the second evaporation core and is then introduced into the compressor.

3. The air conditioning system for a vehicle of claim 1, wherein the cooling module includes a cooling-side exhaust adjusting door disposed between the indoor outlet and the outdoor outlet of the cooling duct and configured to adjust an amount of air exhausted to the outside, and the heating module includes a heating-side exhaust adjusting door disposed between the indoor outlet and the outdoor outlet of the heating duct and configured to adjust an amount of air exhausted to the outside.

4. The air conditioning system for a vehicle of claim 3, wherein the controller is further configured to adjust operation states of the cooling-side exhaust adjusting door and the heating-side exhaust adjusting door,
wherein the controller is further configured to operate the heating-side exhaust adjusting door to close the heating-side indoor outlet, and operate the cooling-side exhaust adjusting door to close the cooling-side outdoor outlet, during the operation of the air conditioning system for the vehicle in the cooling mode.

5. The air conditioning system for a vehicle of claim 3, wherein the controller is further configured to adjust operation states of the cooling-side exhaust adjusting door and the heating-side exhaust adjusting door,
wherein the controller is further configured to operate the heating-side exhaust adjusting door to close the heating-side outdoor outlet, and operate the cooling-side exhaust adjusting door to close the cooling-side indoor outlet, during the operation of the air conditioning system for the vehicle in the heating mode.

* * * * *